United States Patent [19]

Walz

[11] Patent Number: 4,756,637

[45] Date of Patent: Jul. 12, 1988

[54] FITTING, PARTICULARLY FURNITURE FITTING

[75] Inventor: Rüdiger Walz, Nagold, Fed. Rep. of Germany

[73] Assignee: Häfele KG, Fed. Rep. of Germany

[21] Appl. No.: 928,325

[22] Filed: Nov. 6, 1986

[30] Foreign Application Priority Data

Nov. 9, 1985 [DE] Fed. Rep. of Germany ....... 3539853

[51] Int. Cl.⁴ ............................................. B25G 3/00
[52] U.S. Cl. ................................. 403/231; 403/407.1
[58] Field of Search ............ 403/231, 403, 382, 407.1, 403/406.1, 405.1, 327, 376, 323, 263, 343, 409.1, DIG. 8

[56] References Cited

U.S. PATENT DOCUMENTS

| | | | |
|---|---|---|---|
| 4,325,649 | 4/1982 | Röck | 403/231 |
| 4,505,610 | 3/1985 | Röck et al. | 403/407.1 X |
| 4,553,873 | 11/1985 | Salice | 403/407.1 X |
| 4,582,446 | 4/1986 | Salice | 403/407.1 X |
| 4,664,548 | 5/1987 | Brinkmann | 403/407.1 X |

FOREIGN PATENT DOCUMENTS

| | | | |
|---|---|---|---|
| 0015883 | 9/1980 | European Pat. Off. | 403/231 |
| 0058220 | 8/1982 | European Pat. Off. | 403/376 |

Primary Examiner—Randolph A. Reese
Assistant Examiner—Peter M. Cuomo
Attorney, Agent, or Firm—Toren, McGeady & Associates

[57] ABSTRACT

A fitting for connecting two structural components. The fitting includes a locking device mounted on the first structural component and a support device mounted on the second structural component. A rotary member in the support device defines circumferentially extending conical surface against which the front end of the locking device is pressed when the two fitting devices are connected. The force exerted by the front end of the locking device causes the rotary member to be turned. The rotary member has a helical end face which is initially outside of the range of travel of the locking device. Upon turning of the rotary member, the helical end face comes into engagement with a countersurface of the locking device. The resulting connection can only be released by means of a tool. The structural components are pressed tightly together by a further turning of the rotary member. A piece of furniture composed of several structural components can be initially connected without the aid of a tool and can subsequently be tightened after the piece of furniture has been assembled. The fitting makes possible the connection of structural components where the tolerances in assembling the fitting devices are inaccurate or have been exceeded.

19 Claims, 3 Drawing Sheets

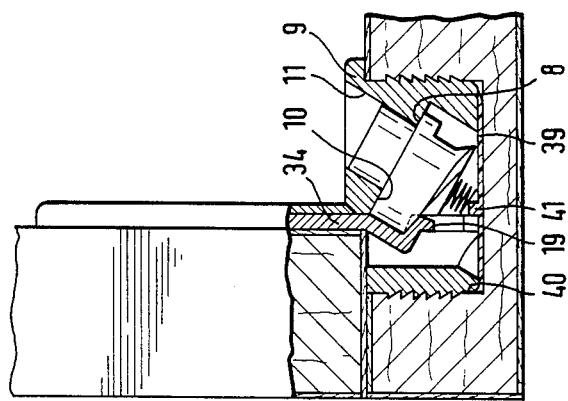
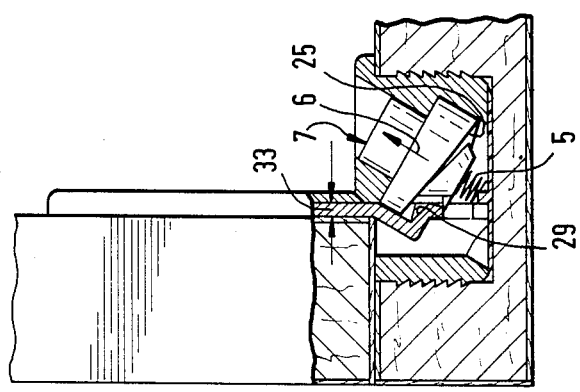
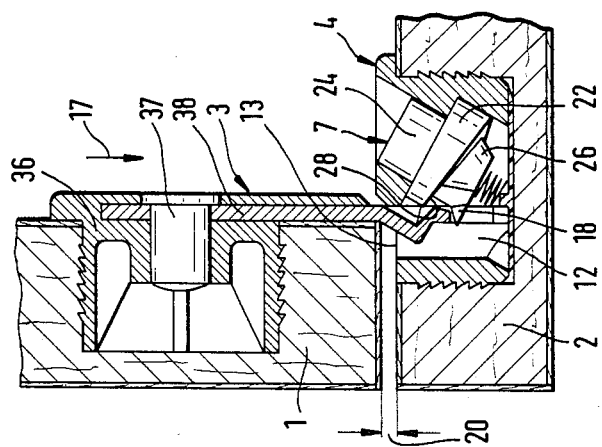

FITTING, PARTICULARLY FURNITURE FITTING

BACKGROUND OF THE INVENTION

1. Field of the Invention

The present invention relates to a fitting for connecting two structural components, particularly two plates or walls of a piece of furniture which extend perpendicularly relative to one another. A locking device is mounted in one of the structural parts and a support device defining a receiving opening for the locking device is mounted in the other structural part. The support device includes a rotary member which has an end face essentially directed against a countersurface formed on the locking member, which countersurface faces against the direction of insertion of the locking device.

2. Description of the Prior Art

A fitting of this type is known, for example, from German Pat. No. 30 09 380. The fitting described in this patent serves for connecting two furniture pieces which extend perpendicularly to one another. When the two furniture pieces, or generally speaking, two structural components, are connected to one another, the rotary member must assume a predetermined position of rotation, hereinafter referred to as the initial position. The locking device and the support device correspond to one another in such a way that a subsequent rotation of the rotary member causes the already essentially correctly aligned structural components to move even more closely toward one another until they finally fully contact one another in order to effect the desired stable connection. The end face of the rotary member interacts at least over a predetermined angle of rotation with the countersurface of the locking device. When the rotary member is turned in the direction for closing, uneccentricity of the end face causes the manually inserted locking member to be pulled further into the interior of the support device. The abutting surfaces, i.e., the end face and the countersurface, must be shaped in such a way that a uniform insertion of the locking device over the entire adjustment range of the fitting is ensured. The connection can be released by rotating the rotary member in the opposite direction. An unintentional release is prevented, for example, by an appropriate clamping or selflocking of the fitting. When the two devices of the fitting are assembled in the intended manner, the angle of rotation of the rotary member required for assembly is less than a full rotation.

The known fitting described above is of simple and robust construction. On the other hand, even a preliminary joining of the two structural components or furniture parts requires that the rotary member be turned by a small angle which can only be done by means of a suitable tool, for example, a wrench, screwdriver, or the like. In fittings of this type, certain inaccuracies must always be expected during assembly. Therefore, it is desirable that the various fittings in a piece of furniture are initially not fully tightened, but that the rotary member and the locking device are only brought into engagement to such an extent that an unintentional release is no longer easily possible. Only when all fittings have been brought into engagement in the described manner, one fitting after the other is once again actuated in order to fully join together the structural components, so that the piece of furniture assumes its final shape and stability.

As mentioned above, the preliminary joining together of the individual structural components requires that the rotary member be actuated by means of a wrench or the like. At the same time, the two structural components must be held together in the correct position. This is difficult for a single person and sometimes impossible when a piece of furniture composed of several structural components is to be assembled. Thus, frequently two persons are required for assembling a piece of furniture.

It is, therefore, the primary object of the present invention to provide a fitting of the aforedescribed type in which the two structural components can be joined together more simply and more quickly. In particular, the assembly of an object, for example, a piece of furniture, composed of several structural components is to be facilitated.

SUMMARY OF THE INVENTION

In accordance with the present invention, the rotary member is biased by a spring essentially against the direction of insertion of the locking device. The end face of the rotary member is a helically shaped surface facing against the force of the spring. The rotary member includes a structural portion defining a conically shaped surface extending in the circumferential direction and spaced in the axial direction from the end of the helical end face. The conical surface is located within the range of travel of the locking device when the rotary member is in the initial position and the conical surface leaves this range when the rotary member is turned by a predetermined angle. The helically shaped end face of the rotary member is located outside of the range of travel of the locking device when the rotary member is in the initial position. Upon turning of the rotary member, the helical end surface begins to engage the countersurface of the locking device at the latest when the conical surface leaves the range of travel of the locking device.

When the fitting according to the present invention is assembled, initially the two fitting components, i.e., the locking device and the support device, are brought into engagement. For that purpose, the structural components to be joined are moved closer together and the locking member is inserted into the receiving opening of the support device. Once the locking device has been inserted to a certain extent into the receiving opening, the locking device makes contact with the conical surface of the rotary member. The conical surface must have such a shape that the force exerted by the locking device on the conical surface when the locking device is inserted causes the rotary member to be turned in the predetermined direction of rotation. The structural portion of the rotary member including the conical surface is more and more pushed out of the range of travel of the locking device until it finally entirely leaves this range. At the same time as the conical surface is being moved out of the range of travel of the locking device, the beginning of the end face of the rotary member is being moved into this range. This beginning of the end face is offset relative to the conical surface in the direction of insertion of the locking device in such a way that it is able to engage the countersurface of the locking device which is moved past the beginning of the end face as the conical surface is being moved away. As a result, the beginning of the end face is now located in front of the countersurface of the locking device as seen in the direction of insertion of the locking device. This means that the locking device is locked within the receiving opening of the support device. The locking member can now no longer be pulled out of the receiving opening without a prior backward turning of the rotary member. Accordingly, the two structural components are now coupled to one another without being tightly joined to one another. The tight pressing together of the two structural components is obtained by a further rotation of the rotary member in the previously effected direction of rotation. A further rotation of the rotary member causes the helical end face of the rotary member to be continuously pressed against the countersurface of the locking device. The helical inclination of the end face forces the locking member deeper and deeper into the receiving opening until the structural component with the locking device is tightly pressed against the structural component with the support device.

The above-described loose connection between the two structural components which can no longer be released without a specific actuation of the rotary member, for example, by means of a wrench or screwdriver, is automatically obtained by a simple insertion of one fitting half into the other, i.e., without the direct action on the rotary member by means of a wrench or the like. It is apparent that the object of the invention is met by means of this fitting and that the connection between the two structural components can be effected in a simple manner. For example, if a piece of furniture composed of several structural components is to be assembled, all the structural components can initially be put together without the aid of a tool. The locking together of the devices of the fitting ensures a secure, loose connection between all structural components of the piece of furniture or the like. The necessary stability of the furniture is obtained later when all rotary members are tightened.

In addition, the automatic preliminary connection of the fittings permits a simple assembly when the tolerances of the individual fittings, for example, with respect to the distance between two locking devices, are inaccurate. This is because each fitting provides enough play so that the fittings can be put together even when certain tolerances have been exceeded. When all the fittings have been locked together, the subsequent tightening of all the rotary members will pose no problems.

The forward end of the locking device and the structural portion containing the conical surface must have such a size and shape and the structural portion must be arranged in such a way that the insertion of the locking device always leads to a rotation of the rotary member. In order to ensure a continuous rotation of the rotary member, the conical surface must be inclined in the direction of rotation toward the interior of the receiving opening. An inclination in essentially the radial direction of the rotary member may also be useful or even necessary. The conical surface, or the structural portion containing the structural surface, must be dimensioned and arranged in such a way in the direction of rotation that the range of travel of the inner end of the locking device is freed to a sufficient extent when the latter is being pressed down by the end face of the rotary member. The same is true for releasing the fitting. In that case, it must be ensured that when the rotary member is turned back, the conical surface can again move underneath the inner end of the locking device. This is made possible particularly by mounting a compression spring which biases the rotary member toward the outside.

This compression spring is also useful during tightening of the fitting. For various reasons, it may be useful if the structural portion of the rotary member including the conical surface has a smaller dimension, for example, in the direction of rotation than the inner end of the locking device. It may also be advantageous if the structural portion including the conical surface is arranged not symmetrically relative to a radial plane of the rotary member. Moreover, it may be possible and advantageous if the beginning of the end face initially extends over the countersurface at a certain distance, while the inner end of the locking device rests against the conical surface. This measure increases the relative mobility of the support device and the locking device, without leading to an undesired uncoupling of the two fitting halves.

In accordance with a further development of the invention, the conical surface is provided on a projection of the rotary member which projects transversely relative to the axis of rotation of the rotary member. Since the beginning of the end face is closer to the receiving opening than is the conical surface and since the free end of the locking device which interacts with the conical surface and the end face of the rotary member is located between the conical surface and the end face, the projection of the rotary member is preferably arranged at the inner end thereof. The length of the conical surface as seen in the direction of rotation is to be dimensioned, so that the end face sufficiently engages over the countersurface of the locking device when the conical surface has been fully moved out of the range of travel of the locking device.

In accordance with another embodiment of the invention, the rotary member is essentially a circular cylinder with a structural portion whose cross-sectional area has the shape of a segment of a circle and is formed by a cut extending parallel to the longitudinal direction. One of the end faces of the cylinder extends perpendicular to the longitudinal axis of the cylinder and the other end face, at least in its outer region, has the shape of a helical surface defining the above-described helical end face. The geometric axis of the helical end face preferably coincides with the axis of the rotary member. The outer surface of the rotary member is formed, at least in the region of the helical end face, by a cylindrical surface with increasing height and by a plane surface extending parallel to the axis. Thus, the helical end face extends from one edge of the plane side surface of the rotary member to the other edge.

In accordance with a preferred embodiment of the invention, the end of the helical end face is located adjacent the projection with the conical surface. Since the inner end of the helical end face in the initial position has practically no significance for safety reasons with respect to the pulling together of the two structural components, it is not important how this inner end and the countersurface are geometrically positioned relative to one another. It is easily conceivable that the inner end of the end face seen in the direction of insertion is located somewhat further inwardly than the conical surface or its upper end which is initially contacted by the locking member.

In accordance with yet another embodiment of the invention, the projection of the rotary member has an approximately triangular member shape, wherein one side of the triangle simultaneously forms a partial surface of the cylindrical surface of the rotary member. Accordingly, the projection is located on one of the side edges of the plane surface portion of the rotary member. The projection is laterally offset relative to a plane extending perpendicularly to the plane surface portion of the rotary member through the axis of rotation. Thus, when pressed down by the front end or surface of the locking device, the necessary torque for the automatic coupling of the support device with the locking device is obtained when the latter is inserted.

The various features of novelty which characterize the invention are pointed out with particularity in the claims annexed to and forming a part of this disclosure. For a better understanding of the invention, its operating advantages and specific objectives attained by its use, reference should be had to the drawings and descriptive matter in which there is illustrated and described a preferred embodiment of the invention.

BRIEF DESCRIPTION OF THE DRAWING

In the drawing:

FIGS. 1 to 3 are sectional views of the fitting according to the invention, shown in three stages of connection.

DETAILED DESCRIPTION OF THE INVENTION

Figure 6:
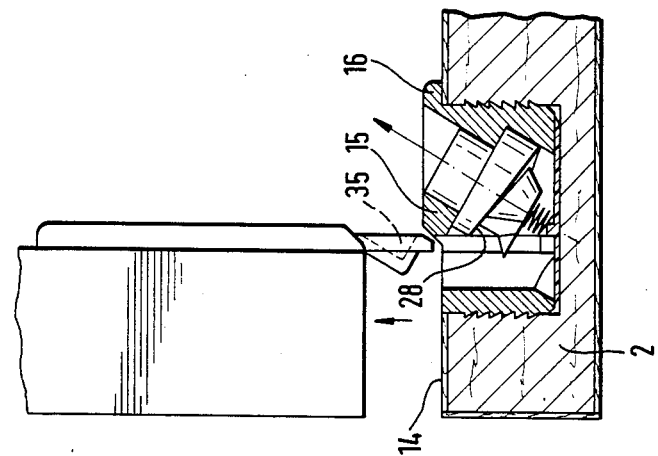
FIGS. 4 to 6 are sectional views showing the three stages when the connection is released.

The fitting illustrated in the drawing is used for connecting two, particularly plate-shaped structural components 1 and 2 which extend at a right angle relative to one another. As can be seen from FIGS. 4 to 6, the connection between the structural components 1 and 2 can be released at any time. The principal components of the fitting are a locking device 3 mounted, for example, in structural component 1 and a support device 4 mounted in this example in structural component 2. The support device 4 is used to put together the structural components as illustrated in FIG. 2 and then to tightly join together these components as illustrated in FIG. 3. Support device 4 has a rotary member 7 which is spring-biased by means of a spring 5 acting in the direction of arrow 6. A shoulder 8 of rotary member 7 rests against an inner step 10 of a cup-shaped fitting body 9, which step is obtained by a stepped reduction of the diameter of bore 11.

Fitting body 9 is preferably a screwed-in member with a receiving space 12. The upper receiving opening 13 of receiving space 12 extends preferably flush with the upper surface 14 of structural component 2. This is obtained by removing a circular segment-shaped portion of the bottom 15 of fitting body 9, which bottom 15 preferably projects in the radial direction slightly beyond the circumferential surface of the cup-shaped fitting body 9. A rim 16 of the cup-shaped fitting body 9 rests on the upper side 14 of structural component 2 as indicated in FIG. 6.

The forward or free end of locking device 3 is inserted in the receiving opening 13 in the direction of insertion 17. Since a conical surface 18 of rotary member 7 is located in the range of travel of the locking device, the movement of insertion ends when the forward edge 19 of locking device 3 makes contact with this conical surface 18. In this position, the two structural components 1 and 2 still have a distance 20 between each other, as shown in FIG. 1. By pressing structural component 1 in direction 17 and as a result of the interaction of the forward edge 19 of locking device 3 with conical surface 18 of rotary member 7, a torque is applied to the rotary member 7 in the direction of arrow 21, as shown in FIG. 7.

Rotary member 7 has an outer surface 22 in the shape of a circular cylinder. However, this circular cylinder does not extend over a full 360°, but is provided with a flattened peripheral surface 23. The diameter of rotary member 7 is reduced in a stepped manner in order to form a bearing pin 24 of circular cylindrical shape. Thus, rotary member 7 has a shoulder 8 which faces upwardly in the direction of arrow 6 and a shoulder facing in the opposite direction. The latter shoulder does not have the shape of an annular ring or annular ring portion, but is shaped as a helically extending end face 25. The inner end of the helical end face 25 is defined by a truncated cone-shaped pin 26 which has a central bore for receiving an end of spring 5.

Since the outer surface 22 of rotary member 7 does not extend over the full 360°, the angle described by the helical end face 25 is also smaller than 360°, such as, about 270°. This angle may also be somewhat smaller or larger.

Figure 7:
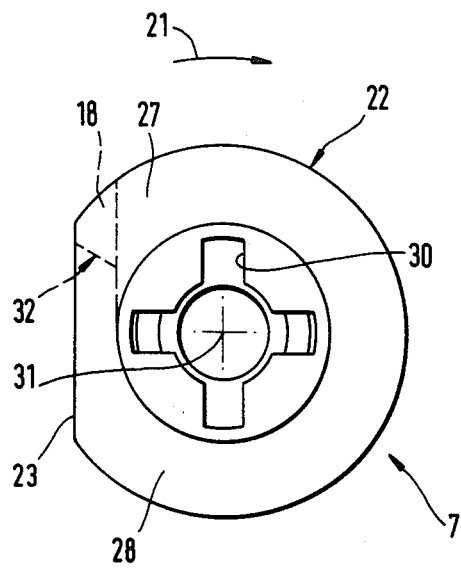
FIG. 7 shows a top view of the rotary member on a larger scale.
Figure 8:
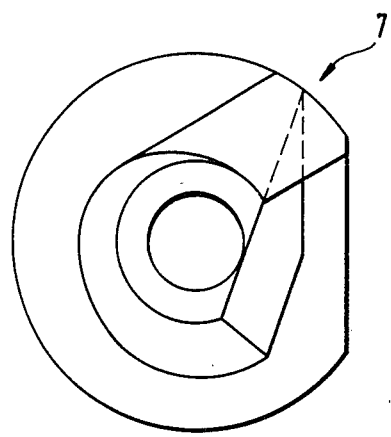
FIG. 8 shows a bottom view of the rotary member on a larger scale.

As can be seen from FIG. 7, conical surface 18 is located adjacent end 27 of helical end face 25, while reference numeral 28 denotes the beginning of the helical end face. FIG. 1 of the drawing shows that the beginning 28 of helical end face 25 is located exactly adjacent or to the right of the range of travel of the locking device 3 when the conical surface 18 projects to its maximum extent into this range. When the locking device 3 or its forward edge 19 turns rotary member 7 in the direction of arrow 21, the conical surface 18 is more and more removed from the range of travel of the locking device 3. To the same extent, however, the helical end face 25 is moved into the range of travel of the locking device 3.

The forward end of locking device 3 in direction 17 has formed therein a countersurface 29. When the rotary member 7 is rotated, countersurface 29 is located behind the beginning 28 of helical end face 25 as seen in direction 17. Thus, the beginning 28 of helical end face 25 can engage over this countersurface 29. The inclination of countersurface 29 is essentially the same as that of helical end face 25 with which it makes contact. Structural component 1 rests against structural component 2 when conical surface 18 has been fully moved out of the range of travel of locking device 3 or when conical surface 18 is located in front of a chamfered portion adjacent the forward edge 19 of locking device 3, compare FIG. 2. If beginning 28 of helical end face 25 is at this time not yet in contact with countersurface 29, which is preferably the case (FIG. 2), a further rotation of rotary member 7 in the direction of arrow 21, for example, by a quarter or half turn, finally results in the position illustrated in FIG. 3. In that position, the helical end face 25 presses strongly with its middle or end portion against countersurface 29 and a secure connection between structural components 1 and 2 is obtained in this manner. Rotary member 7 is turned by means of a wrench or screwdriver which is inserted into an appropriate receiving portion in the outer end of bearing pin 24. The receiving portion may have, for example, the shape of a cross-type recess.

The conical surface 18 is located on a projection 32 of rotary member 7 extending transversely to the axis of rotation 31 of rotary member 7. Since, as illustrated in the drawing, axis 31 of rotary member 7 extends slightly inclined relative to the direction 17 of inserting locking device 3, projection 32 does not project beyond the flattened peripheral surface 23. In the initial position illustrated in FIG. 1, the forward end of locking device 3 can be moved in an unimpaired manner past the beginning 28 of the helical end face, while the projection 32 with the helical surface is located within the range of travel of the locking device 3. The conical surface of projection 32 is shaped and downwardly inclined in the direction of rotation, so that the pressure exerted in the direction of arrow 17 by the locking device 3 causes a rotation of the rotary member in the direction of arrow 21. If axis 31 were to extend parallel or almost parallel to direction 17, the projection 32 would have to project to an appropriate extent beyond flattened peripheral surface 23. On the other hand, the slight inclination of rotary member 7 makes possible an especially simple and uncomplicated actuation of the rotary member by means of a turning tool.

The receiving opening 13 of fitting body 9 has the shape of a circle of a segment. However, the corners of the segment at the ends of the cord are not formed as an acute angle, but are formed as rectangular grooves. The width of each groove corresponds to the thickness 33 of end 34 of locking device 3 and the distance between grooves corresponds approximately to the width of end 34 in the direction extending perpendicular to the plane of the drawing Accordingly, end 34 of locking device 3 has the shape of a flat tongue with a rib-like recess 45 for forming countersurface 29. The front edge 19 of end 34 preferably extends perpendicular to the plane of the drawing and to the direction of insertion 17.

Locking device 3 has a screwed-in plug 36 which has the same shape and size of support device 4 and is provided in the known manner with circumferential grooves having the cross-sectional shape of sawteeth. A plate-shaped member is fastened, for example, by means of a rivet 37, to plug 36. The end of the plate-shaped member facing away from the plug 36 is provided with the above-described rib-like recess 35. Plate-shaped member 38 may be inserted into a pocket of plug 36. On the other hand, it is also possible to manufacture the entire locking device 3 as a single piece.

As explained above, fitting body 9 has the shape of a cup. The rim of the cup-shaped body 9 is placed on the bottom of a blind-end bore 40 of structural component 2. A cover 39, preferably of plastics material, is placed on the rim on the bottom of the bore 40. The inwardly facing surface of cover 39 has a ledge 41 whose lateral ends engage in a clamping manner in the above-mentioned lateral grooves of receiving opening 13. In this manner, cover 39 is held on fitting body 9. At the same time, ledge 41 serves to support the lower end, as seen in the drawing, of compression spring 5.

Figure 5:
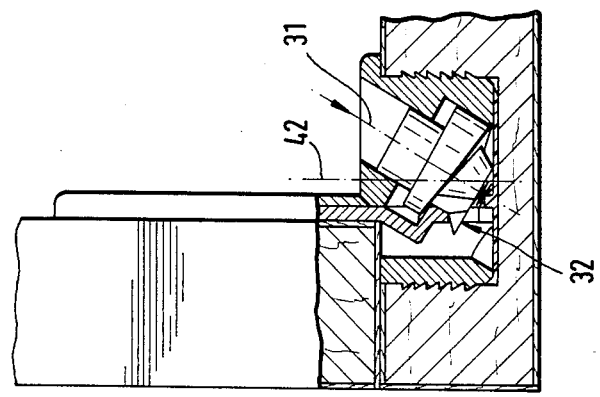

The geometric axes 31 and 42 of rotary member 7 and fitting body 9, respectively, are illustrated in FIG. 5. In the illustrated embodiment, the two axes include an angle of about 30°.

FIGS. 1 to 3 show, as mentioned above, the various stages of connecting the fitting according to the invention. In FIG. 1, an essentially correct alignment between structural parts 1 and 2 has already been achieved. In FIG. 2, the structural components 1 and 2 rest against one another, however, they are not yet pressed together. On the other hand, structural component 1 can no longer be moved to a substantial extent away from structural component 2 against the direction of arrow 17 because the engagement of helical end face 25 and the oppositely directed countersurface 29 of end 34 of locking device 3 prevents a removal of end 34 out of receiving opening 13. End 34 could only be removed if the rotary member is turned against the direction of arrow 21 by means of a tool. This loose connection between the two structural components 1 and 2 according to FIG. 2 which can no longer be released without a tool facilitates the assembly of a piece of furniture composed of a plurality of plate-shaped parts without the aid of a tool. Subsequently, the fittings of the piece of furniture are tightened by turning the rotary members of all fittings.

Figure 4:
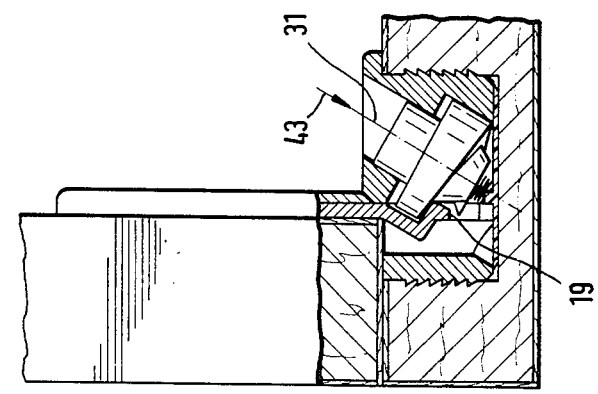

The release of the connection between the structural components 1 and 2 is illustrated in FIGS. 4 to 6. The tool required for turning the rotary member 7 is not illustrated. Starting from the position illustrated in FIG. 3, the rotary member 7 is initially turned backwards by about a half turn. At the same time, the rotary member is pushed in the direction of arrow 43 against the force of spring 5. Projection 32 with conical surface 18 has now been moved to some extent under the front edge 19 of locking device 3. The initial position of the rotary member illustrated in FIG. 1 is reached by further turning the rotary member 7 against the direction of arrow 21 while, at the same time, pressing in the direction of arrow 43. The position illustrated in FIG. 5 has now been reached. In this position, the beginning 28 of helical end face 25 has reached the receiving opening 13. In the positions illustrated in FIGS. 4 and 5, the rotary member 7 has been turned relative to the initial position by an angle of about 40°. If the rotary member 7 is now released, it is pressed by compression spring 5 outwardly against the direction of arrow 43. As a result, the beginning of the helical end face 25 which previously had projected into the range of travel of locking device 3 has now been moved out of this range, so that the rib-like recess 35 and, consequently, the locking device with the entire structural part 1 can be released.

The angle between the positions of rotary member 7 assumed in FIGS. 1 and 2 is preferably also about 40°, while the angle between the positions assumed in FIGS. 2 and 3 is approximately another 170° or 180°.

While a specific embodiment of the invention has been shown and described in detail to illustrate the application of the inventive principles, it will be understood that the invention may be embodied otherwise without departing from such principles.

I claim:
1. A fitting for connecting two structural parts, comprising a locking device mounted in one of the structural parts and a support device mounted in the other of the structural parts, the support device defining a receiving opening, the locking device movable in a direction of insertion and having a projecting member insertable in the receiving opening, the projecting member of the locking device movable within a range of travel, the projecting member defining a countersurface essentially facing against the direction of insertion of the locking device into the receiving opening, a rotary member mounted in the support device, the rotary member being spring-biased essentially against the direction of insertion of the projecting member, the rotary member rotatable from a first initial position into a second position, the rotary member defining a helically shaped end face essentially facing in the direction of insertion of the projecting member, the rotary member having a structural portion defining a conically shaped surface extend- ing outwardly in a circumferential direction and being spaced in an axial direction from an end of the helical end face, the conical surface projecting in the initial position of the rotary member into the range of travel of the projecting member, and the helical end face of the rotary member in the initial position located outside of the range of travel of the projecting member, wherein the conical surface and the helical end face are located relative to each other on the rotary member in such a way that, upon turning of the rotary member from the initial position, the helical end face enters the range of travel of the projecting member and engages the countersurface of the projecting member at the latest when the conical surface leaves the range of travel of the projecting member, the structural portion including the conical surface being a projection of the rotary member extending transversely of the axis of rotation of the rotary member, the rotary member having essentially the shape of a circular cylinder with a portion of the cylinder cut approximately parallel to the longitudinal axis thereof, the cut portion having the cross-sectional area of a segment of a circle, and the top of the cylinder extending perpendicularly to the longitudinal axis at the bottom of the cylinder defines at least in its radially outer region the helical end face.

2. A fitting according to claim 1, wherein the end of the helical end face and the projection with the conical surface are located adjacent each other.

3. A fitting according to claim 2, wherein the projection has an approximately triangular shape, and wherein a side of the triangle forms a portion of a cylindrical outer surface of the rotary member.

4. A fitting according to claim 1, wherein the rotary member defines a central blind-end bore, a compression spring mounted in the support member resting against the inner end of the bore.

5. A fitting according to claim 1, wherein the cylindrical rotary member has a top side and wherein the top side of the cylinder of the rotary member is attached a plug-shaped actuating projection, the actuating projection defining a receiving recess for a turning tool, the support device comprising a fitting body received in a recess formed in the structural component in which the support device is mounted therein and the fitting body defining a bore in which the actuating projection is rotatably received.

6. A fitting according to claim 5, wherein the fitting body of the support device is essentially cup-shaped, the bottom of the cup-shaped fitting body projecting radially beyond the recess receiving the support device, the bottom of the fitting body defining the receiving opening for the projecting member of the locking device.

7. A fitting according to claim 6, wherein the receiving opening has approximately the shape of a segment of a circle with lateral grooves formed at the plane surface defining the receiving opening, and wherein at least the projecting member of the locking device has the shape of a flat tongue.

8. A fitting according to claim 7, wherein the countersurface of the locking device forms part of a rib-like recess in the projecting member of the locking device.

9. A fitting according to claim 8, wherein the projecting member of the locking device has a front edge which extends approximately perpendicularly to the direction of insertion of the projecting member, the countersurface of the projecting member extending inclined relative to the plane of the projecting member and relative to the front edge.

10. A fitting according to claim 7, wherein the locking device comprises a screw-in plug and a plate-shaped member mounted on the screwed-in plug and extending perpendicularly to the longitudinal axis thereof.

11. A fitting according to claim 7, wherein a cover is placed on the rim of the cup-shaped fitting body, the end of the compression spring facing away from the rotary member being attached to the cover.

12. A fitting according to claim 11, wherein the cover is of plastics material.

13. A fitting according to claim 12, comprising means for clamping the cover to the fitting body.

14. A fitting according to claim 12, comprising means for locking the cover to the fitting body.

15. A fitting according to claim 13, wherein the clamping means is formed by a ledge or two spaced apart projections attached to the cover which engage the lateral grooves of the receiving opening.

16. A fitting according to claim 15, wherein a geometrical axis of the rotary member is inclined to the axis of rotation of the rotary member, and wherein an end of the compression spring facing away from the rotary member rests against the ledge of the cover.

17. A fitting according to claim 1, wherein the helical end face of the rotary member extends over an angle of about 180° to 270°.

18. A fitting according to claim 1, wherein the beginning of the helical end face of the rotary member is offset relative to the conical surface by an angle of about 70° to 110°.

19. A fitting according to claim 1, wherein the structural components are plates or walls of a piece of furniture.

* * * * *